(12) United States Patent
Fanson (10) Patent No.: US 7,281,716 B2
(45) Date of Patent: Oct. 16, 2007

(54) VARYING A SUSPENSION LINKAGE RATIO IN A VEHICLE SUSPENSION

(75) Inventor: David J. Fanson, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 464 days.

(21) Appl. No.: 10/840,118

(22) Filed: May 6, 2004

(65) Prior Publication Data

US 2005/0248116 A1 Nov. 10, 2005

(51) Int. Cl.
*B60G 17/00* (2006.01)

(52) U.S. Cl. .............................. 280/5.52; 280/86.757; 280/124.101; 280/124.135; 280/124.136; 280/124.138; 280/124.145; 280/124.15

(58) Field of Classification Search ............ 280/5.508, 280/5.509, 5.512, 5.52, 5.521, 86.757, 124.101, 280/124.102, 124.134–12.136, 124.138, 280/124.139, 124.141, 124.145, 124.146, 280/124.15

See application file for complete search history.

(56) References Cited

U.S. PATENT DOCUMENTS

| 3,858,902 | A | * | 1/1975 | Howells et al. | .......... | 280/6.159 |
| 4,546,997 | A | * | 10/1985 | Smyers | ..................... | 280/5.509 |
| 4,632,413 | A | * | 12/1986 | Fujita et al. | .......... | 280/124.103 |
| 5,620,199 | A | * | 4/1997 | Lee | ......................... | 280/5.521 |
| 6,805,362 | B1 | * | 10/2004 | Melcher | .................... | 280/5.52 |

* cited by examiner

*Primary Examiner*—Ruth Ilan
(74) *Attorney, Agent, or Firm*—Scott A. McBain (57) ABSTRACT

A method and apparatus for actively tuning a vehicle suspension, operatively connect a wheel of the vehicle to a chassis of the vehicle with a suspension apparatus including a control arm of fixed length, having an inboard end thereof adapted for articulating attachment to the chassis, an outboard end thereof adapted for articulating attachment to the wheel, and a selectively movable intermediate attachment point thereof disposed between the inboard and outboard ends of the control arm and adapted for attachment of a compressible suspension element. The intermediate attachment point is selectively movable, with respect to the inboard and outboard ends of the control arm, to vary a suspension linkage ratio for changing the stiffness and/or height of the suspension apparatus at one or more corners of the vehicle, to thereby allow active tuning of the suspension during operation of the vehicle.

12 Claims, 8 Drawing Sheets

VARYING A SUSPENSION LINKAGE RATIO IN A VEHICLE SUSPENSION

TECHNICAL FIELD OF THE INVENTION

This invention relates to vehicle suspensions, and more particularly to a method and apparatus for varying a suspension linkage ratio in a vehicle suspension.

BACKGROUND OF THE INVENTION

Wheeled vehicles often utilize a suspension system, at one or more corners of the vehicle, in which a wheel is attached to a chassis of the vehicle by several suspension elements, including a generally horizontally extending articulating control arm. The control arm has an inboard end thereof attached in an articulating manner to the chassis, and an outboard end thereof attached in an articulating manner to a steering knuckle, or other structure, including an axle supporting the wheel. Having the inboard and outboard ends of the control arm articulated in this manner allows the inboard and outboard ends of the control arm to move up and down with respect to one another, during operation of the vehicle.

One or more compressible suspension elements, such as a spring or a damper, are also typically connected between the chassis of the vehicle and a fixed intermediate attachment point on the control arm, at a point located between the inboard and outboard ends of the control arm, for supporting the vehicle on the suspension and limiting motion of the suspension during various operating conditions of the vehicle.

In the majority of suspension systems used in the past, the various elements making up the suspension system are passive, in that once they are manufactured and installed in the suspension system, their performance parameters are not adjusted, during operation of the vehicle, to actively tune the suspension to accommodate variables such as differing road surfaces, operating speeds, or how heavily or lightly the vehicle may be loaded. The ability to actively tune a suspension is highly desirable.

Some prior suspension systems have used various approaches to provide active suspension tuning, but these approaches have generally been too complex and costly to find wide acceptance and use. In one prior approach, compressible suspension elements include springs or dampers having cavities for containing compressed air, supplied by an onboard compressor and pneumatic system. In a similar prior approach, compressible suspension elements include springs or dampers having cavities for containing variable amounts of hydraulic fluid, supplied by an onboard hydraulic pump and hydraulic system. An onboard computer controls the compressible suspension elements in response to signals generated by sophisticated system of sensors placed throughout the vehicle. By varying the amount or the pressure of air or hydraulic fluid in the cavities of the compressible suspension elements, the height of the chassis can be varied, to compensate for changes in vehicle loading, or the stiffness of the suspension at the corners of the vehicle can be varied to provide improved handling during maneuvering of the vehicle. The need to carry a hydraulic or pneumatic system, and the bulkiness and cost of the compressible suspension elements have limited the use of such prior actively tuned suspension systems.

In another more recent approach to providing an actively tunable suspension system, hydraulic dampers in the suspension systems are filled with a special magnetorheological (MR) fluid, which changes viscosity when exposed to a magnetic field, and the dampers are equipped with electrical coils for impressing a magnetic flux on the MR fluid. By varying the electrical current provided to the coils, the viscosity of the MR fluid can be actively controlled, which in turn causes the damper to become more, or less stiff, depending upon the level of electrical current that is applied. While such MR damping systems work well, and are considerably less complex and smaller in size than other prior approaches using hydraulic or pneumatic systems, the cost of the MR fluid and MR dampers is high enough that their use has been limited to only a few relatively high priced vehicles.

What is needed is an improved method and apparatus for providing an actively tunable vehicle suspension, that overcomes one or more of the problems described above.

SUMMARY OF THE INVENTION

The present invention provides an improved method and apparatus for actively tuning a vehicle suspension, by operatively connecting a wheel of the vehicle to a chassis of the vehicle with a suspension apparatus including a control arm of fixed length, having an inboard end thereof adapted for articulating attachment to the chassis, an outboard end thereof adapted for articulating attachment to the wheel, and a selectively movable intermediate attachment point thereof disposed between the inboard and outboard ends of the control arm and adapted for attachment of a compressible suspension element. The intermediate attachment point is selectively movable, with respect to the inboard and outboard ends of the control arm, to vary a suspension linkage ratio, for changing the stiffness and/or height of the suspension apparatus at one or more corners of the vehicle, to thereby allow active tuning of the suspension during operation of the vehicle.

In one form of the invention, a suspension apparatus for operatively connecting a wheel of a vehicle to a chassis of the vehicle is provided. The suspension apparatus includes a control arm, a compressible suspension element, and an actuator. The control arm has a fixed length, with an inboard end thereof adapted for articulating attachment to the chassis, an outboard end thereof adapted for articulating attachment to the wheel, and a selectively movable intermediate attachment point thereof disposed between the inboard and outboard ends of the control arm and adapted for attachment of a compressible suspension element. The compressible suspension element includes an upper end adapted for articulating attachment to the chassis and a lower end operatively attached to the movable intermediate attachment point of the control arm. The actuator is operatively attached for selectively moving the intermediate attachment point with respect to the inboard and outboard ends of the control arm.

Some forms of the invention further include an articulating element having a first end thereof operatively attached to a fixed intermediate point disposed between the inboard and outboard ends of the control arm, for rotation about the fixed intermediate point, and further having a distal end thereof defining the movable intermediate attachment point. The control arm defines a common centerline extending through both the inboard and outboard articulating ends of the control arm. In alternate embodiments of the invention, the movable intermediate attachment point of the articulating element may be disposed above or below the common centerline.

The actuator may be a linear actuator, having a first end thereof operatively attached to the intermediate attachment point, and a second end thereof operatively attached to the control arm. Alternatively, the first end of the linear actuator may be operatively attached to the intermediate attachment point, and a second end thereof operatively attached to the vehicle chassis. The actuator may be an electrically driven actuator.

The present invention may also take the form of a method for varying a suspension linkage ratio in a vehicle suspension, according to the invention.

The foregoing and other features and advantages of the invention will become further apparent from the following detailed description of exemplary embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Throughout the following descriptions and the accompanying drawings, describing alternate embodiments of the invention, like elements will be identified by the same reference numerals.

DETAILED DESCRIPTION

FIGS. 1-5 show a first exemplary embodiment of the invention, in the form of a suspension apparatus 10 for operatively connecting a wheel 12 of a vehicle to a chassis (not shown) of the vehicle. The first exemplary embodiment of the suspension apparatus 10 includes a lower control arm 14, a compressible suspension element 16, an actuator 18, an articulating element 20, an upper control arm 22, a stabilizer bar 24, and a steering knuckle 26.

Figure 1:
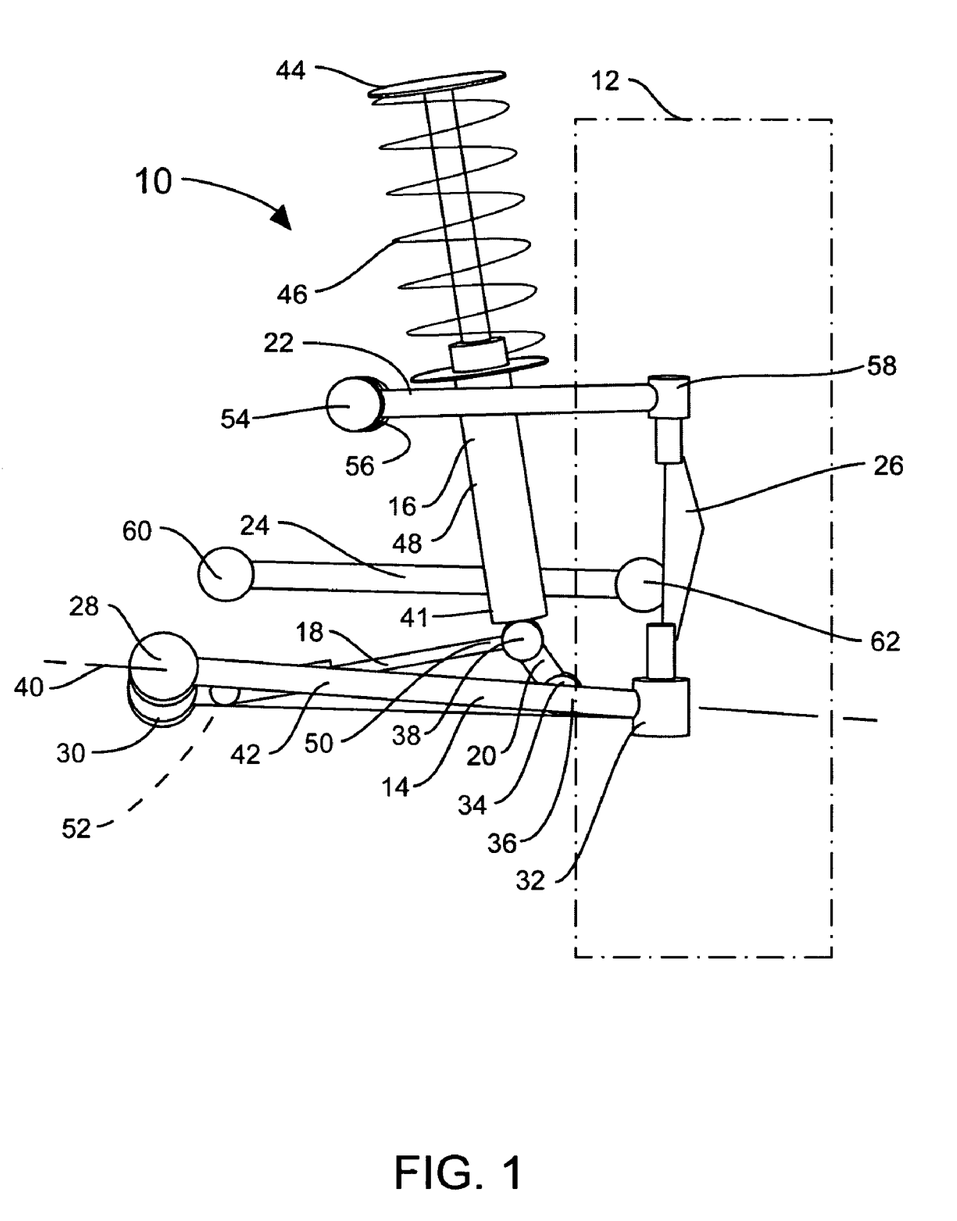
FIG. 1 is a schematic representation of a first exemplary embodiment of a suspension apparatus, according to the invention, with a movable intermediate attachment point shown in an inboard position.
Figure 4:
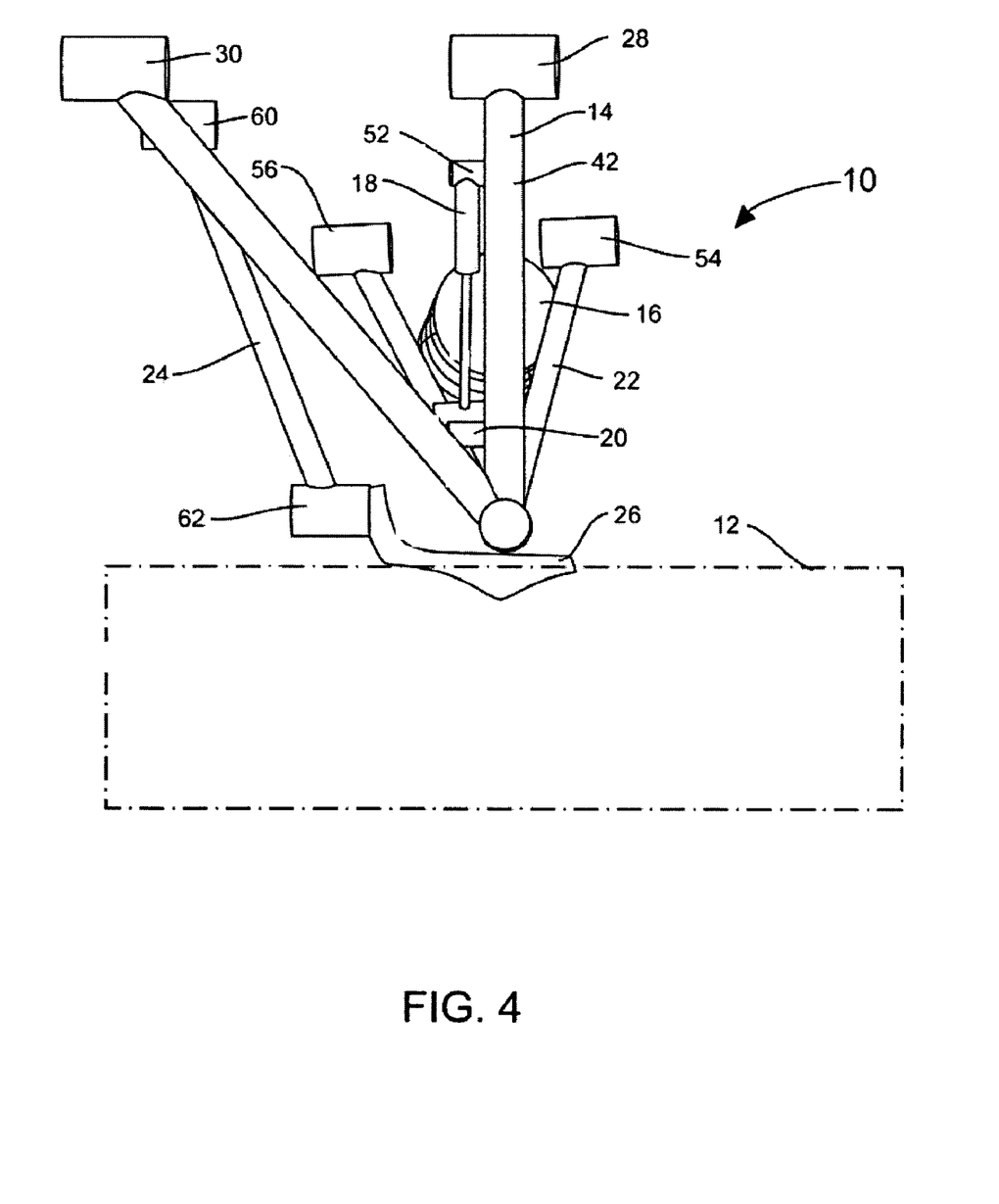
FIG. 4 is a bottom view of the exemplary embodiment of FIGS. 1-3.
Figure 5:
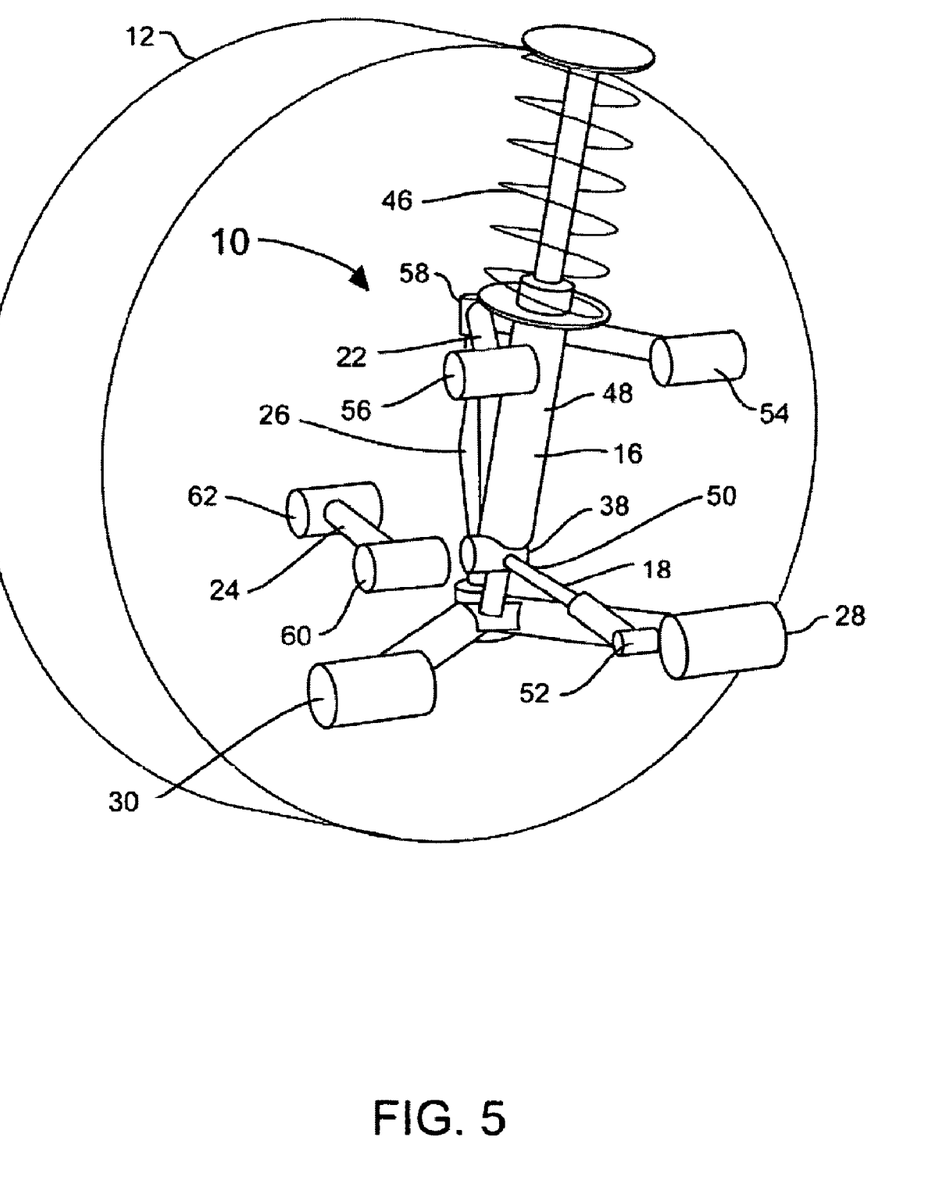
FIG. 5 is a perspective view of the exemplary embodiment of the suspension apparatus shown in FIGS. 1-4.

As shown in FIGS. 1, 4 and 5, the lower control arm 14 has a fixed length, and is generally A-shaped, with inboard ends 28, 30 thereof adapted for articulating attachment to the chassis, and the outboard end 32 thereof adapted for articulating attachment to the bottom end of the steering knuckle 26. The steering knuckle 26 provides operative attachment of the lower control arm 14 to the wheel 12, which is mounted on an axle (not shown) extending from the steering knuckle 26.

The articulating element 20 has a first end 34 thereof operatively attached to a fixed intermediate point 36 on the control arm 14, disposed between the inboard and outboard ends 28, 20 of the control arm 14, for rotation about the fixed intermediate point 36. The distal end of the articulating element 20 defines a movable intermediate attachment point 38 of the lower control arm 14, adapted for articulating attachment to the lower end (as shown) of the compressible suspension element 16. In the first exemplary embodiment, the control arm 14 defines a common centerline 40 extending through both the inboard and outboard articulating ends 28, 32 of the front leg 42 (as shown) of the control arm 14, and the movable intermediate attachment point 38, defined by the distal end of the articulating element 20, is disposed above the common centerline 40.

The compressible suspension element 16 of the first exemplary embodiment has a lower end 41 thereof rotatably attached to the intermediate attachment point 38, formed by the distal end of the articulating element 20. The upper end 44 of the compressible suspension element 16 is adapted for articulating attachment to the vehicle chassis. The compressible suspension element 16 of the first exemplary embodiment includes both a coil spring 46, for supporting the vehicle, and a damper 48, as is known in the art.

Figure 2:
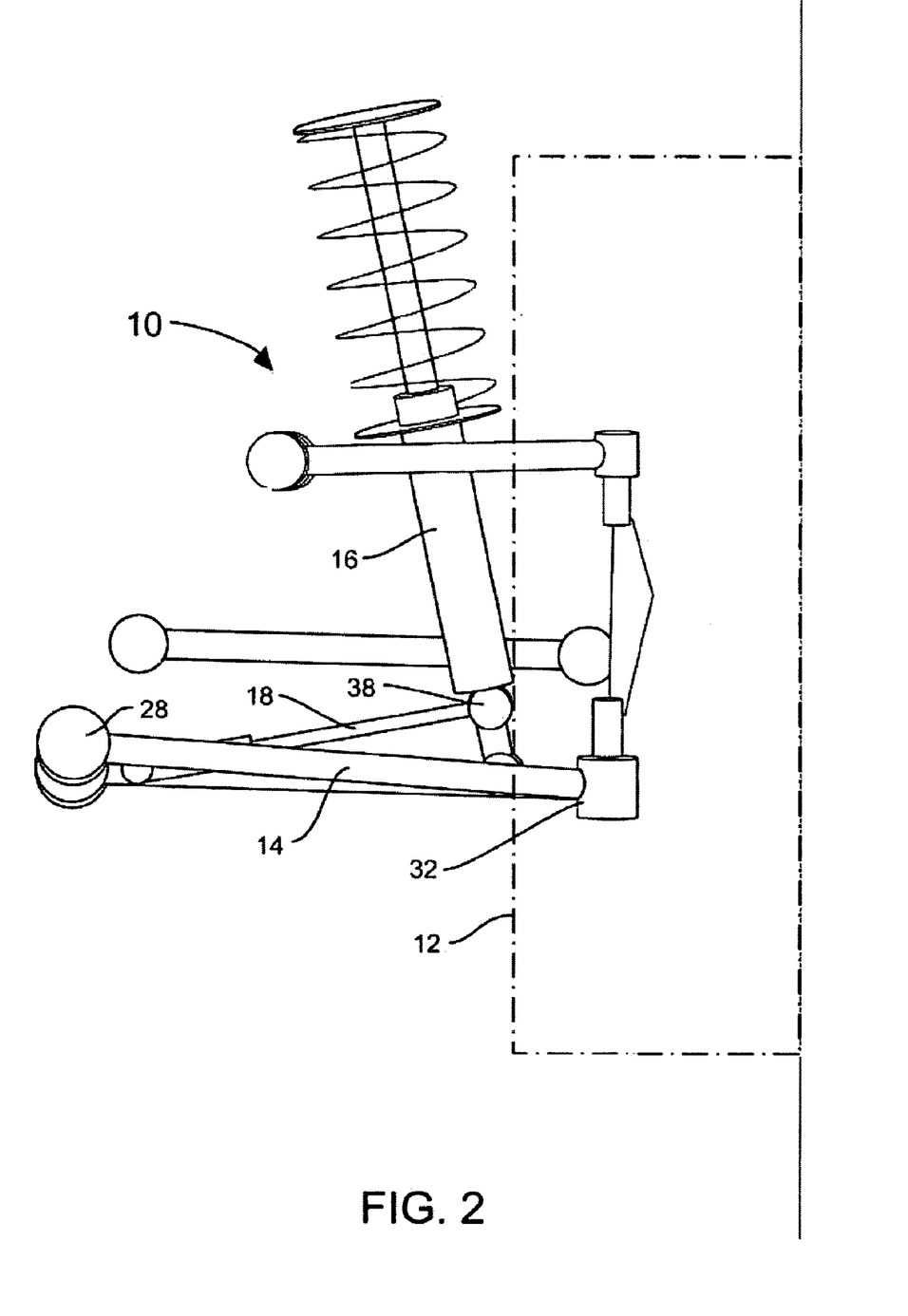
FIGS. 2 and 3 are schematic representations of the first exemplary embodiment of FIG. 1 with the movable intermediate attachment point shown in an intermediate position and an outboard position, respectively.
Figure 3:
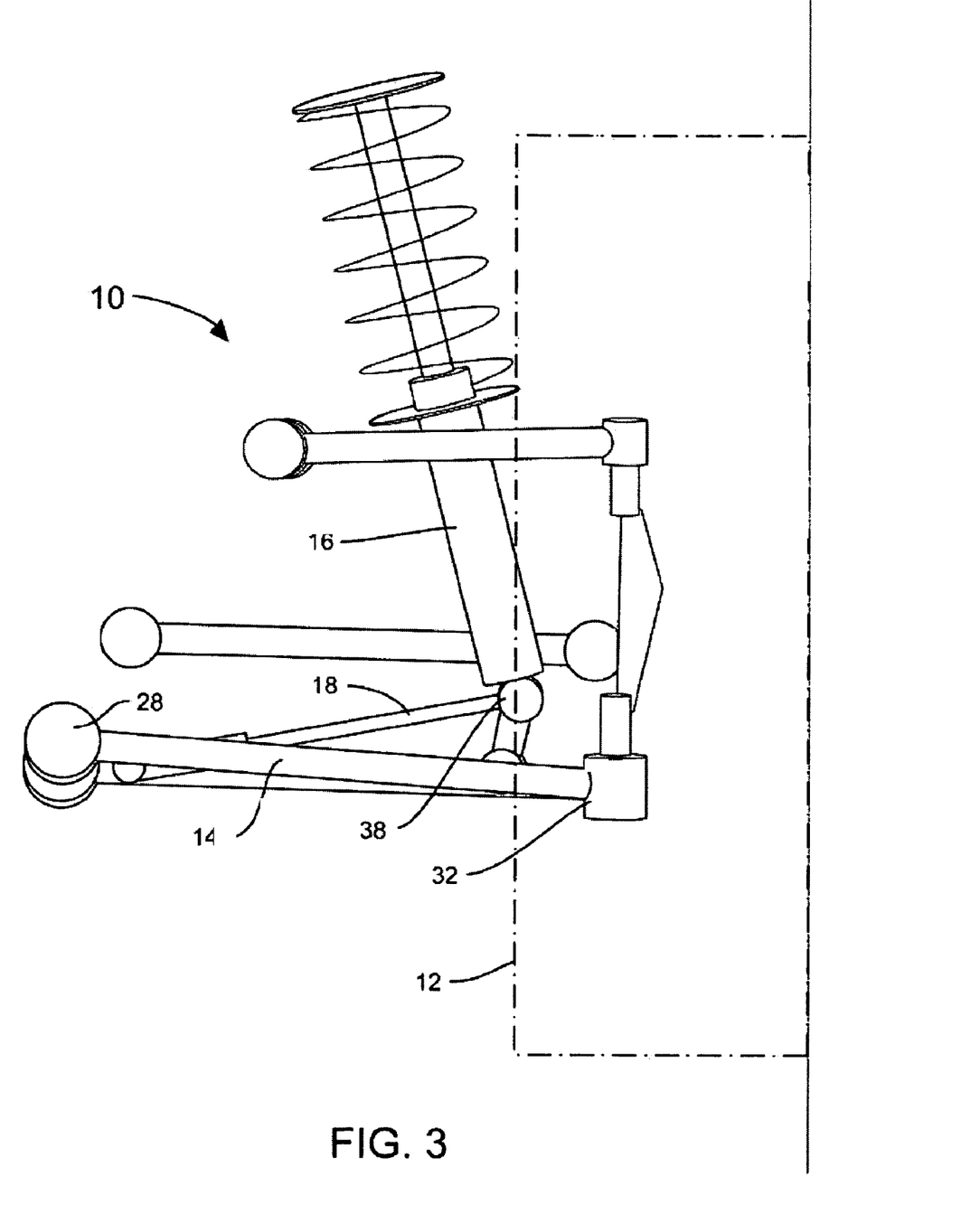

The actuator 18 is operatively attached for selectively moving the intermediate attachment point 38, with respect to the inboard and outboard ends 28, 32 of the front leg 42 of the control arm 14. FIGS. 1, 2, and 3, respectively show the movable intermediate attachment point 38 in an inboard position, an intermediate position, and an outboard position. The actuator 18 in all embodiments shown herein is a linear actuator having a first end 50 thereof operatively attached by the articulating element 20 to the intermediate attachment point 38, and a second end 52 thereof operatively attached to the front leg 42 of the lower control arm 14. It is contemplated that a linear actuator having an electric motor driving a ball screw is particularly well suited for use as the actuator 18 in various embodiments of the invention, but other types of actuators may also be used in practicing the invention.

The inboard ends 54, 56, 60 of the upper control arm 22, and the stabilizer bar 24, are adapted for articulating attachment to the vehicle chassis. The outboard ends 58, 62 of the upper control arm 22, and the stabilizer bar 24, are adapted for articulating attachment to the steering knuckle 28.

With the components configured and connected as described above, the vehicle suspension 10 can be actively tuned, to accommodate different vehicle loading and operating conditions, by using the actuator 18 to selectively move the intermediate attachment point 38 with respect to the inboard and outboard ends 28, 32 of the lower control arm 14, to thereby change the linkage ration of the suspension apparatus 10. When the intermediate attachment point 38 is located at an inboard position, as shown in FIG. 1, the leverage available at the wheel 12 for compressing the compressible suspension element 16 is increased, thereby giving a softer ride. When the intermediate attachment point 38 is located at an outboard board position, as shown in FIG. 3, the leverage available at the wheel 12 for compressing the compressible suspension element 16 is decreased, thereby giving a stiffer ride. When the intermediate attachment point 38 is located at an intermediate position, as shown in FIG. 2, an intermediate level of leverage is available at the wheel 12 for compressing the compressible suspension element 16, thereby giving an intermediate level of ride stiffness.

Those having skill in the art will recognize that the present invention provides an apparatus and method for actively tuning a suspension apparatus that is considerably less complex, smaller in physical size, and less costly to produce than prior approaches to actively tuning a vehicle suspension.

Those skilled in the art will also readily recognize that, while the embodiments of the invention disclosed herein are presently considered to be preferred, various changes and modifications can be made without departing from the spirit and scope of the invention.

Figure 6:
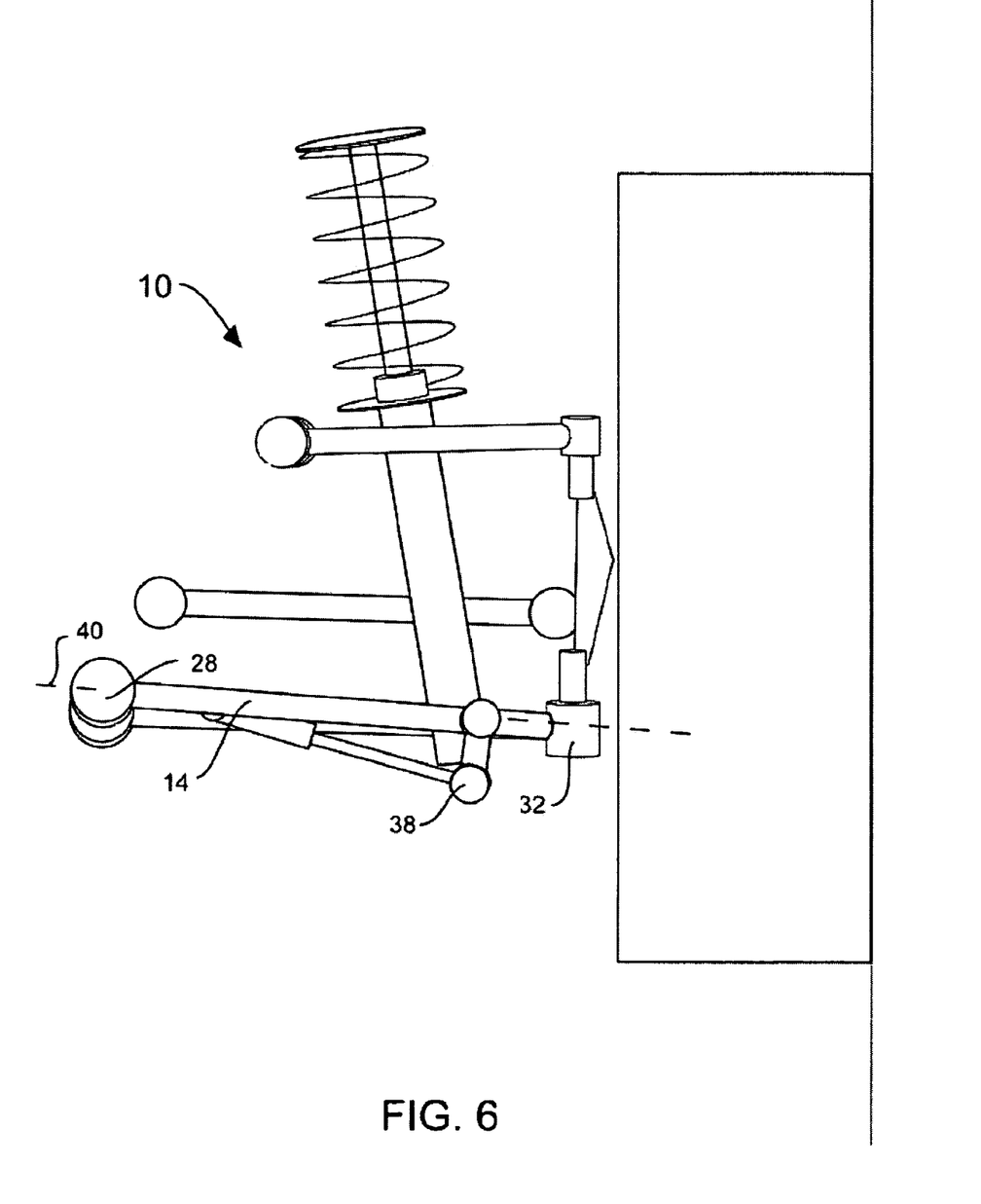
FIGS. 6 and 7, respectively, are schematic front and perspective views of an alternate exemplary embodiment of a suspension apparatus, according to the invention, having the movable intermediate attachment point disposed below a control arm, rather than above the control arm, as is the case in the embodiment shown in FIGS. 1-5.
Figure 7:
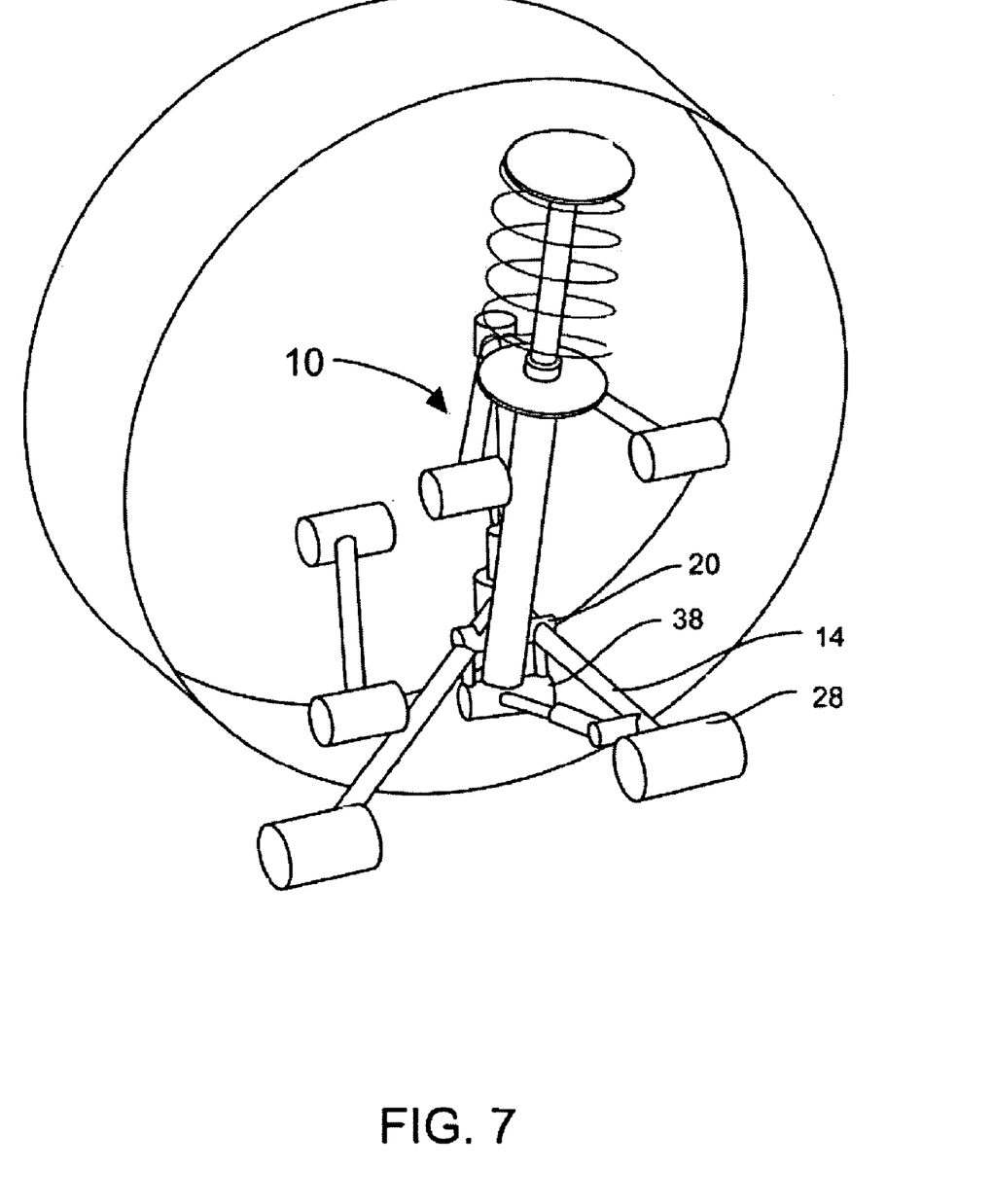

For example, as shown in FIGS. 6 and 7, in alternate embodiments of the invention, the movable intermediate attachment point 38 of the articulating element 20 may be disposed below the common centerline 40 passing through the inboard and outboard ends 28, 32 of the lower control arm 14, rather than above the centerline 40 as was the case in the first exemplary embodiment shown in FIGS. 1-5. The second end 52 of the actuator 18 may also be attached to the control arm 14 at a point outboard of the articulated element 20, rather than inboard as shown herein. The second end 52 of the actuator 18 may also be attached to the chassis, rather than to the control arm 14, in other embodiments of the invention.

Figure 8:
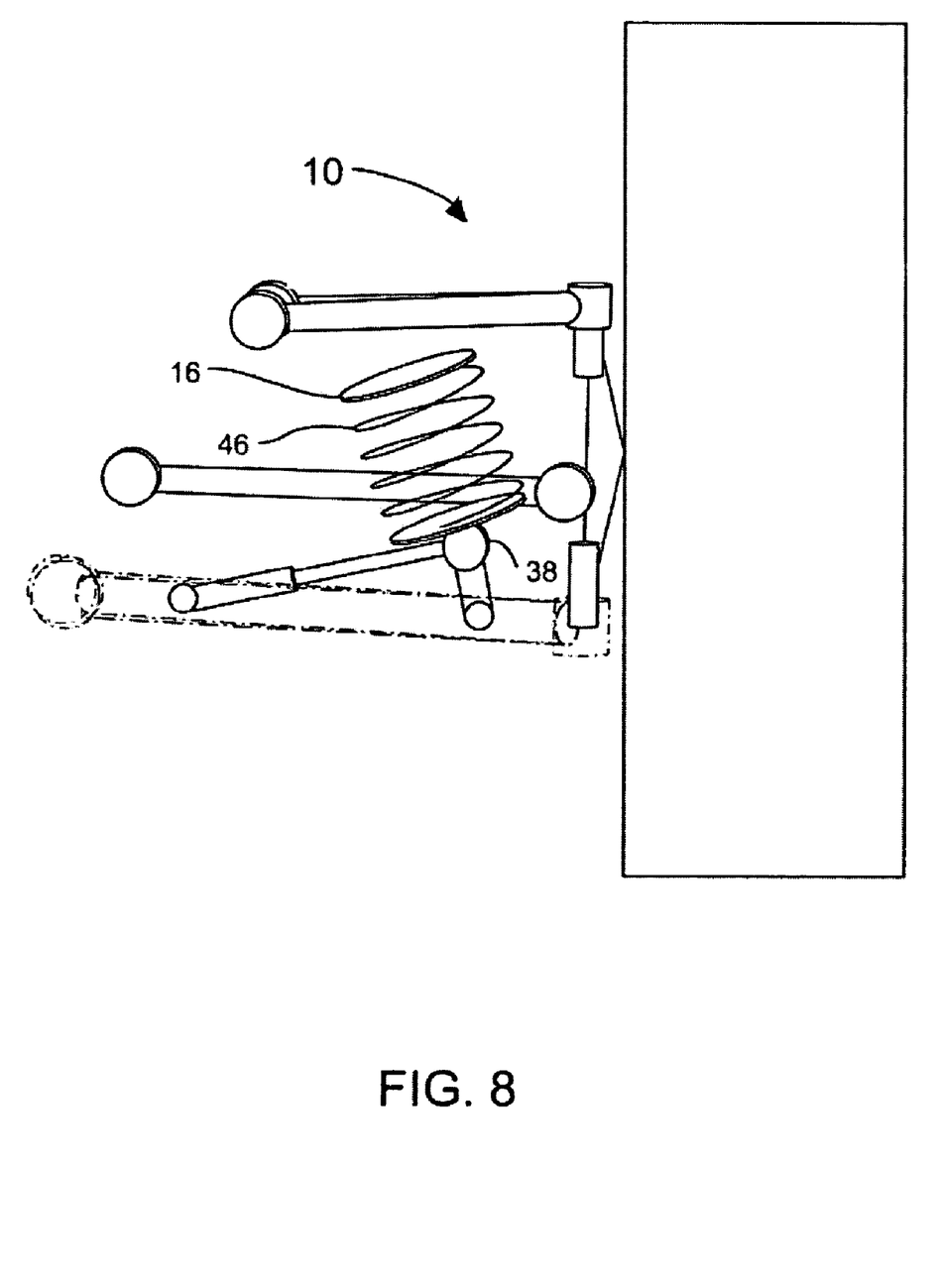
FIG. 8 is a schematic representation of an alternate exemplary embodiment of a suspension apparatus, according to the invention, having a compressible suspension element including only a spring, rather than both a spring and a damper, as was the case in the compressible suspension elements shown in FIGS. 1-7.

As shown in FIG. 8, the invention may be practiced with compressible suspension elements 16 having only a spring 46 attached to the movable intermediate attachment point 38, or conversely with compressible suspension elements 16 having only a damper (not shown) attached to the movable intermediate attachment point 38. The invention may also be practiced with suspension apparatuses having more or fewer control arms and stabilizer bars than the suspension apparatuses 10 of the exemplary embodiments described herein.

The scope of the invention is indicated in the appended claims, and all changes or modifications within the meaning and range of equivalents are intended to be embraced therein.

I claim:

1. A suspension apparatus for operatively connecting a wheel of a vehicle to a chassis of the vehicle, the suspension apparatus comprising
    a control arm of fixed length having an inboard end thereof adapted for articulating attachment to the chassis and an outboard end thereof adapted for articulating attachment to the wheel,
    a compressible suspension element having an upper end adapted for articulating attachment to the chassis and a lower end;
    an articulating element having a first end rotatably attached to the control arm between the inboard and outboard ends and a second end attached to the lower end of the compressible member to form an intermediate attachment point; and
    an actuator attached to the intermediate attachment point for moving the attachment point relative to the inboard and outboard ends of the control arm.

2. The suspension apparatus of claim 1, wherein the compressible suspension element includes a spring.

3. The suspension apparatus of claim 1, wherein the compressible suspension element includes a damper.

4. The suspension apparatus of claim 1, wherein the actuator is a linear actuator having a first end operatively attached to the intermediate attachment point, and a second end operatively attached to the control arm.

5. The suspension apparatus of claim 4, wherein the linear actuator is an electrically driven actuator.

6. The suspension apparatus of claim 1, wherein the control arm defines a common centerline extending through both the inboard and outboard articulating ends of the control arm, and the intermediate attachment point of the articulating element is disposed above the common centerline.

7. The suspension apparatus of claim 1, wherein the control arm defines a common centerline extending through both the inboard and outboard articulating ends of the control arm, and the intermediate attachment point of the articulating element is disposed below the common centerline.

8. A suspension apparatus for operatively connecting a wheel of a vehicle to a chassis of the vehicle, the suspension apparatus comprising:
    a control arm of fixed length having an inboard end thereof adapted for articulating attachment to the chassis and an outboard end thereof adapted for articulating attachment to the wheel;
    an articulating element having a first end rotatably attached to the control arm between the inboard end and the outboard end and a distal end, whereby said distal end defines an intermediate attachment point adapted for attachment of a compressible suspension element; and
    a compressible suspension element having an upper end adapted for articulating attachment to the chassis and a lower end operatively attached to the intermediate attachment point of the control arm; and
    an actuator for selectively moving the intermediate attachment point with respect to the inboard and outboard ends of the control arm; wherein the actuator includes a first end thereof operatively attached to the intermediate attachment point and a second end thereof operatively attached to the control arm.

9. The suspension apparatus of claim 8, wherein the control arm defines a common centerline extending through both the inboard and outboard articulating ends of the control arm, and the intermediate attachment point of the articulating element is disposed above the common centerline.

10. The suspension apparatus of claim 8, wherein the control arm defines a common centerline extending through both the inboard and outboard articulating ends of the control arm and the intermediate attachment point of the articulating element is disposed below the common centerline.

11. The suspension apparatus of claim 8, wherein the actuator is an electrically driven actuator.

12. A method for varying a suspension linkage ratio in a vehicle suspension operatively connecting a wheel of the vehicle to a chassis of the vehicle, the method comprising:
    connecting the wheel to the chassis with a suspension apparatus including a control arm of fixed length having an inboard end thereof adapted for articulating attachment to the chassis, and an outboard end thereof adapted for articulating attachment to the wheel, an articulating element having a first end rotatably attached to the control arm between the inboard end and the outboard end and a distal end defining a selectively movable intermediate attachment point, a compressible suspension element having an upper end adapted for articulating attachment to the chassis and a lower end operatively attached to the movable intermediate attachment point of the control arm; and an actuator for selectively moving the intermediate attachment point with respect to the inboard and outboard ends of the control arm; and selectively moving, using the actuator, the intermediate attachment point with respect to the inboard and outboard ends of the control arm.

* * * * *